(12) United States Patent
Huang et al.

(10) Patent No.: US 9,470,571 B2
(45) Date of Patent: Oct. 18, 2016

(54) LIQUID LEVEL MEASURING DEVICE

(71) Applicant: National Applied Research Laboratories, Hsinchu (TW)

(72) Inventors: Chun-Ming Huang, Hsinchu (TW); Gang-Neng Sung, Hsinchu (TW); Chen-Chia Chen, Hsinchu (TW); Wei-Chang Tsai, Hsinchu (TW)

(73) Assignee: NATIONAL APPLIED RESEARCH LABORATORIES, Hsinchu (TW)

( * ) Notice: Subject to any disclaimer, the term of this patent is extended or adjusted under 35 U.S.C. 154(b) by 211 days.

(21) Appl. No.: 14/519,883

(22) Filed: Oct. 21, 2014

(65) Prior Publication Data

US 2016/0054165 A1   Feb. 25, 2016

(30) Foreign Application Priority Data

Aug. 22, 2014   (TW) .............................. 103128977 A (51) Int. Cl.
| | | |
|---|---|---|
| *G01F 23/00* | (2006.01) | |
| *G01F 23/28* | (2006.01) | |
| *G01R 33/02* | (2006.01) | |
| *G01F 23/26* | (2006.01) | |

(52) U.S. Cl.
CPC ...................... *G01F 23/26* (2013.01)

(58) Field of Classification Search
None
See application file for complete search history.

(56) References Cited

U.S. PATENT DOCUMENTS

| | | | | |
|---|---|---|---|---|
| 4,833,919 A * | 5/1989 | Saito | ........................ | G01B 7/02 324/207.17 |
| 5,315,873 A * | 5/1994 | Jin | ........................ | B22D 2/003 73/309 |
| 8,199,021 B2 * | 6/2012 | Keller | ..................... | G01F 23/22 340/603 |
| 8,714,234 B2 * | 5/2014 | Dussud | ................. | B22D 2/003 164/151.3 |
| 9,086,314 B2 * | 7/2015 | Czarnek | ................. | G01F 23/68 |
| 2011/0012592 A1 * | 1/2011 | Paradise | ................. | G01F 23/68 324/207.16 |

* cited by examiner

*Primary Examiner* — Michael A Lyons
*Assistant Examiner* — Jermaine Jenkins
(74) *Attorney, Agent, or Firm* — Hauptman Ham, LLP (57) ABSTRACT

A liquid level measuring device comprises an inner-tube unit having an inner tube and at least one inner-tube coil surrounding the inner tube; an outer-tube unit having a plurality of outer tubes, each outer tube having a plurality of outer-tube coils disposed thereon, the outer tubes being stacked, the inner tube being arranged inside the outer tubes and being risen and fallen as a level of a liquid in the outer tubes varies; and a control unit electrically connecting to the respective outer-tube coils, the control unit transmitting a set of position coded signals to the outer-tube coils disposed on an individual outer tube, the control unit determining the liquid level according to an induced signal generated by the inner-tube coil. Said device has many advantages including low cost and modular design, and such a device is easily to be deployed.

14 Claims, 6 Drawing Sheets

LIQUID LEVEL MEASURING DEVICE

CROSS-REFERENCE TO RELATED APPLICATIONS

This application claims priority to Taiwan Patent Application No. 103128977, filed on Aug. 22, 2014.

TECHNICAL FIELD OF THE INVENTION

The present invention relates to a liquid level measuring device, and more particularly to a liquid level measuring device adopting induction coils to measure the level of a liquid.

BACKGROUND OF THE INVENTION

Extreme weather events occur frequently as global warming raises the temperature of the earth. Rivers are often flooding, and the flooding becomes more and more serious in urban areas. Therefore, it is an urgent issue to monitor the water level of a river or a reservoir, or in an area which is easily flooded. In addition, water level or liquid level monitoring is required in other technical fields as well, for example, monitoring the level of a liquid or water for industrial use. The water level or liquid level measurement is very important in many fields. Therefore, it is necessary to develop a low-cost and efficient liquid level measuring device for serving the needs of these industries.

SUMMARY OF THE INVENTION

An objective of the present invention is to provide a liquid level measuring device which can measure the level of a liquid in a low-cost and efficient manner.

To achieve the above objective, the present invention provides a liquid level measuring device, which comprises an inner-tube unit having an inner tube and at least one inner-tube coil surrounding the inner tube; an outer-tube unit having a plurality of outer tubes, each outer tube having a plurality of outer-tube coils disposed thereon, the outer tubes being stacked along a vertical direction, the inner tube being arranged inside the outer tubes and being risen and fallen as a liquid level of a liquid in the outer tubes varies; and a control unit electrically connecting to the respective outer-tube coils, the control unit transmitting a set of position coded signals to the outer-tube coils disposed on an individual outer tube and transmitting the same set of position coded signals to the outer-tube coils of every one of the outer tubes sequentially, the at least one inner-tube coil generating an induced signal through electromagnetic induction with the outer-tube coils corresponding to a liquid level where the inner tube is at, the control unit determining the liquid level according to the induced signal generated by the at least one inner-tube coil and information about a height of one outer tube receiving the position coded signals at the time the at least one inner-tube coil generates the induced signal.

In another aspect, the present invention provides a liquid level measuring device, which comprises an outer-tube unit having an outer tube and at least one outer-tube coil surrounding the outer tube; an inner-tube unit having a plurality of inner tubes, each inner tube having a plurality of inner-tube coils disposed thereon, the inner tubes being stacked along a vertical direction, the outer tube embracing the inner tubes and being risen and fallen as a liquid level varies; and a control unit electrically connecting to the respective inner-tube coils, the control unit transmitting a set of position coded signals to the inner-tube coils disposed on an individual inner tube and transmitting the same set of position coded signals to the inner-tube coils of every one of the inner tubes sequentially, the at least one outer-tube coil generating an induced signal through electromagnetic induction with the inner-tube coils corresponding to a liquid level where the outer tube is at, the control unit determining the liquid level according to the induced signal generated by the at least one outer-tube coil and information about a height of one inner tube receiving the position coded signals at the time the at least one outer-tube coil generates the induced signal.

By way of inducing the inner-tube coil through electromagnetic induction by a set of position coded signals sequentially applied to a plurality of outer-tube coils of each outer tube by the control unit, the present invention carries out the liquid level measurement and particularly, real-time monitoring of liquid level. The liquid level measuring device of the present invention has advantages including low cost and easy deployabilty in considerable amounts. Also, in the present invention, the outer tubes are carried out by a modular design. The outer tubes are similar or the same to one another in structure and size. Accordingly, the demands for measurements on different scales of liquid levels can be met as long as simply increasing or decreasing the number of the outer tubes. Furthermore, as long as simply changing the dimension or size of the outer tubes, the liquid level measuring device can be adapted to application environments of different scales. The cost for developing new products is quite low. In addition, it is easily to replace the outer tubes when damaged.

DETAILED DESCRIPTION OF THE INVENTION

The present invention provides a liquid level measuring device. In industrial applications, the liquid level measuring device can be used to measure the level of a liquid or water for industrial use. Said device provides a steady and long-term liquid level measurement. Moreover, according to the present invention, the liquid level measuring device can also be deployed in a rapid river or stream, or in an area which is easily flooded. Said device can monitor the water level in real time and provide flood warnings or high water level warnings. The liquid level measuring device of the present invention carries out real-time monitoring of liquid level by at least one inner-tube coil arranged on an inner tube and a plurality of outer-tube coils arranged on plural outer tubes, said inner-tube coil being induced (i.e., through electromagnetic induction) by signals applied to the outer-tube coils. Said device has advantages including low cost and easy deployabilty in considerable amounts. Also, the outer tubes are modular outer tubes. The number of the outer tubes can be determined according to application environments' needs. The liquid level measuring device is highly adapted to the application environments. Also, by changing dimension or size design of the outer tubes, said device is easily to be applied to liquid level measurement in different scales of application environments.

Figure 1:
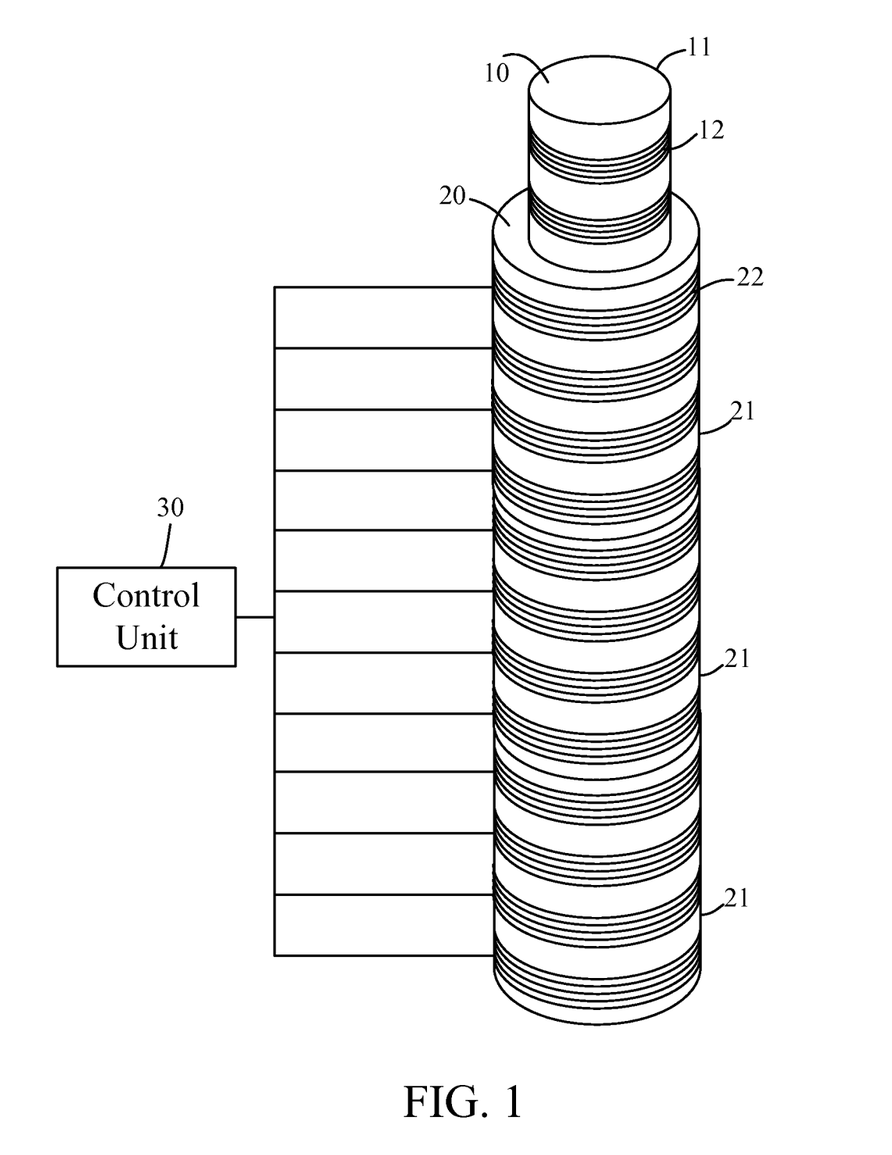
FIG. 1 is a schematic diagram showing a liquid level measuring device in accordance with a first embodiment of the present invention.

FIG. 1 is a schematic diagram showing a liquid level measuring device in accordance with a first embodiment of the present invention. The liquid level measuring device according to the first embodiment of the present invention comprises an inner-tube unit 10, an outer-tube unit 20, and a control unit 30. The inner-tube unit 10 has an inner tube 11 and at least one inner-tube coil 12 (preferably, at least two inner-tube coils). The inner-tube coil 12 surrounds the inner tube 11. The outer-tube unit 20 has a plurality of outer tubes 21. Each outer tube 21 has a plurality of outer-tube coils 22 surrounding thereon. The outer tubes 21 are modular outer tubes which are identical in structure and size. That is, it is easily to substitute one outer tube 21 with another outer tube 21.

The outer tubes 21 are stacked along a vertical direction (i.e., a direction perpendicular to a liquid surface), and are arranged preferably along a straight line. By various ways, a liquid may enter an area encompassed by the outer tubes 21 such that the liquid level goes up. The liquid flows out of the outer tubes 21 such that the liquid level goes down. Also, a communication tube principle may be utilized such that the level of a liquid in the outer tubes 21 is the same as that of an outer liquid, and meanwhile the measured liquid level is identical to the level of the outer liquid. The radial length of the inner tube 11 is smaller than that of the outer tubes 21. The inner tube 11 is disposed inside the outer tubes 21. The inner tube 11 is risen and fallen as the level of a liquid in the outer tubes 21 varies. The body of the inner tube 11 may be made of wood, plastic, or electric non-conductive hollow metal materials.

As long as the shape of the inner tube 11 matches that of the outer tubes 21, the shapes of cross-sections of the inner tube 11 and the outer tubes 21 are not limited to a circle, a triangle, a quadrangle, and a polygon, as well as any other geometrical shapes can be applied thereto. The inner tube 11 can be a tubular object and can also be carried out by a solid column. The inner tube indicated in the present disclosure actually covers column implementations, and is not merely limited to a hollow body.

The control unit 30 is electrically connected to the respective outer-tube coils 22. That is, the control unit 30 is electrically connected to each outer-tube coil 22 of all the outer tubes 21. Such connections allow the control unit 30 to apply a signal to an individual outer-tube coil 22 of the outer tubes 21. Also, the control unit 30 receives an induced signal generated by the inner-tube coil 12 through electromagnetic induction, and processes the induced signal and performs related calculations.

The operational principle of the liquid level measuring device of the present invention is described below.

Firstly, the control unit 30 applies signals to the outer-tube coils 22. Specifically, the control unit 30 transmits a set of position coded signals to the outer-tube coils 22 disposed on an individual outer tube 21, and the control unit 30 sequentially transmits the same set of position coded signals to the outer-tube coils 22 of every one of the outer tubes 21. For example, the control unit 30 transmits a set of position coded signals to the outer-tube coils 22 of the lowest out tube 21. Then, the control unit 30 transmits the set of position coded signals to the outer-tube coils 22 of a middle outer tube 21. Finally, the control unit 30 transmits the set of position coded signals to the outer-tube coils 22 of the highest outer tube 21. Of course, such an order can be inverted, that is, from the highest outer tube 21 to the lowest outer tube 21.

The position coded signals make the inner-tube coil 12 generate different induced signals at different heights of one individual outer tube 21. That is to say, an induced signal generated by the inner-tube coil 12 at some height of an outer tube 21 is different from that generated by the inner-tube coil 12 at another height of the outer tube 21. Accordingly, by way of the position coded signals, it can be known a height where the inner tube 11 is located at with respect to an outer tube 21.

The position coded signals comprises electronic signals having different physical properties. For example, the position coded signals have different signal waveforms, frequencies, voltages, and/or polarities. For example, one outer-tube 21 has four independent outer-tube coils 22 disposed thereon. The control unit 30 transmits a signal having a first waveform to a first outer-tube coil 22, transmits a signal having a second waveform to a second outer-tube coil 22, transmits a signal having a third waveform to a third outer-tube coil 22, and transmits a signal having a fourth waveform to a fourth outer-tube coil 22. The control unit 30 can determine a height where the inner tube 11 is located with respect to an outer tube 21 according to an induced main waveform (i.e., a waveform with largest amplitude in the waveform components) generated by the inner-tube coil 12.

During the control unit 30 sequentially transmits the set of position coded signals to each outer tube 21 to scan all of the outer tubes 21, the inner-tube coil 12 generates an induced signal through electromagnetic induction with the outer-tube coils 22 corresponding to a liquid level where the inner tube 11 is at. The induced signal generated by the inner-tube coil 12 can be transmitted to the control unit 30 through several approaches listed below for subsequent processes and calculations.

(1) A signal induction approach. The induced signal generated by the inner-tube coil 12 can then be induced by the outer-tube coils 22 of an outer tube 21 corresponding to the inner tube 11 through electromagnetic induction. The induced signal generated by the outer-tube coils 22 of the outer tube 21 can be directly transmitted to the control unit 30 via the connection wires inherently connecting the outer-tube coils 22 to the control unit 30.

(2) A wireless transmission approach. The induced signal generated by the inner-tube coil 12 can be transmitted to the control unit 30 through wireless transmission. A selectable wireless transmission comprises NFC, Bluetooth, and infrared transmission.

(3) A wire transmission approach. The inner-tube coil 12 can be electrically connected to the control unit 30 via a cable connection. The induced signal generated by the inner-tube coil 12 can be directly transmitted to the control unit 30 via the cable.

The control unit 30 interprets the induced signal generated by the inner-tube coil 12 and determines a particular height where the inner tube 11 is at with respect to a single outer tube 21 through a transfer function or table. Also, since the position coded signals transmitted to the outer-tube coils 22 are transmitted by the control unit 30, the control unit 30 can know which outer tube 21 the induced signal generated by the inner-tube coil 12 corresponds to and information about a height of the outer tube 21. Accordingly, the control unit 30 can determine the liquid level according to the induced signal generated by the inner-tube coil 12 and information about a height of one outer tube 21 receiving the position coded signals at the time the inner-tube coil 22 generates the induced signal.

In addition, as to the above-described signal induction approach, the control unit 30 can also determine which outer tube 21 the induced signal generated by the inner-tube coil 12 is generated corresponding to by way of determining which one of the outer tubes 21 transmits signals to the control unit 30. The control unit 30 therefore determines an outer tube 21 corresponding to a liquid level where the inner tube 11 is at and height information of said outer tube 21.

By way of inducing the inner-tube coil 12 through electromagnetic induction by a set of position coded signals sequentially applied to a plurality of outer-tube coils 22 of each outer tube 21 by the control unit 30, the present invention carries out the liquid level measurement and particularly, real-time monitoring of liquid level. The liquid level measuring device of the present invention has advantages including low cost and easy deployabilty in considerable amounts. Also, in the present invention, the outer tubes 22 are carried out by a modular design. The outer tubes 22 are similar or the same to one another in structure and size. Accordingly, the demands for measurements on different scales of liquid levels can be met as long as simply increasing or decreasing the number of the outer tubes 22. Furthermore, as long as simply changing the dimension or size of the outer tubes 22, the liquid level measuring device can be adapted to application environments of different scales. The cost for developing new products is quite low. In addition, it is easily to replace the outer tubes 22 when damaged.

During the control unit 30 transmits the set of position coded signals to the outer-tube coils 22 of each outer tube 21 sequentially, the control unit 30 can also firstly transmits the position coded signals to the outer-tube coils 22 of one outer tube 21 corresponding to a previously determined liquid level. That is to say, the control unit 30 can record or identify an outer tube 21 corresponding to a previously determined liquid level. When measuring the liquid level, the control unit 30 can firstly scan the outer tube 21 corresponding to the previously determined liquid level in current measurement for improving the speed of liquid level measurement.

The above-mentioned outer-tube coils 22 can further be used to wirelessly charge electronic components in the inner-tube unit 10 in a period not proceeding the liquid level measurement. For example, if the induced signal generated by the inner-tube coil 12 is transmitted to the control unit 30 through a wireless transmission via a communication element, the control unit 30 can control the outer-tube coils 22 to wirelessly charge the communication element in the inner-tube unit 10 in a period not proceeding the liquid level measurement for maintaining the power of the communication element.

An example is given below to illustrate how the position coded signals can make the induced signal generated by the inner-tube coil 12 correspond to a height with respect to one individual outer tube 21.

Figure 2:
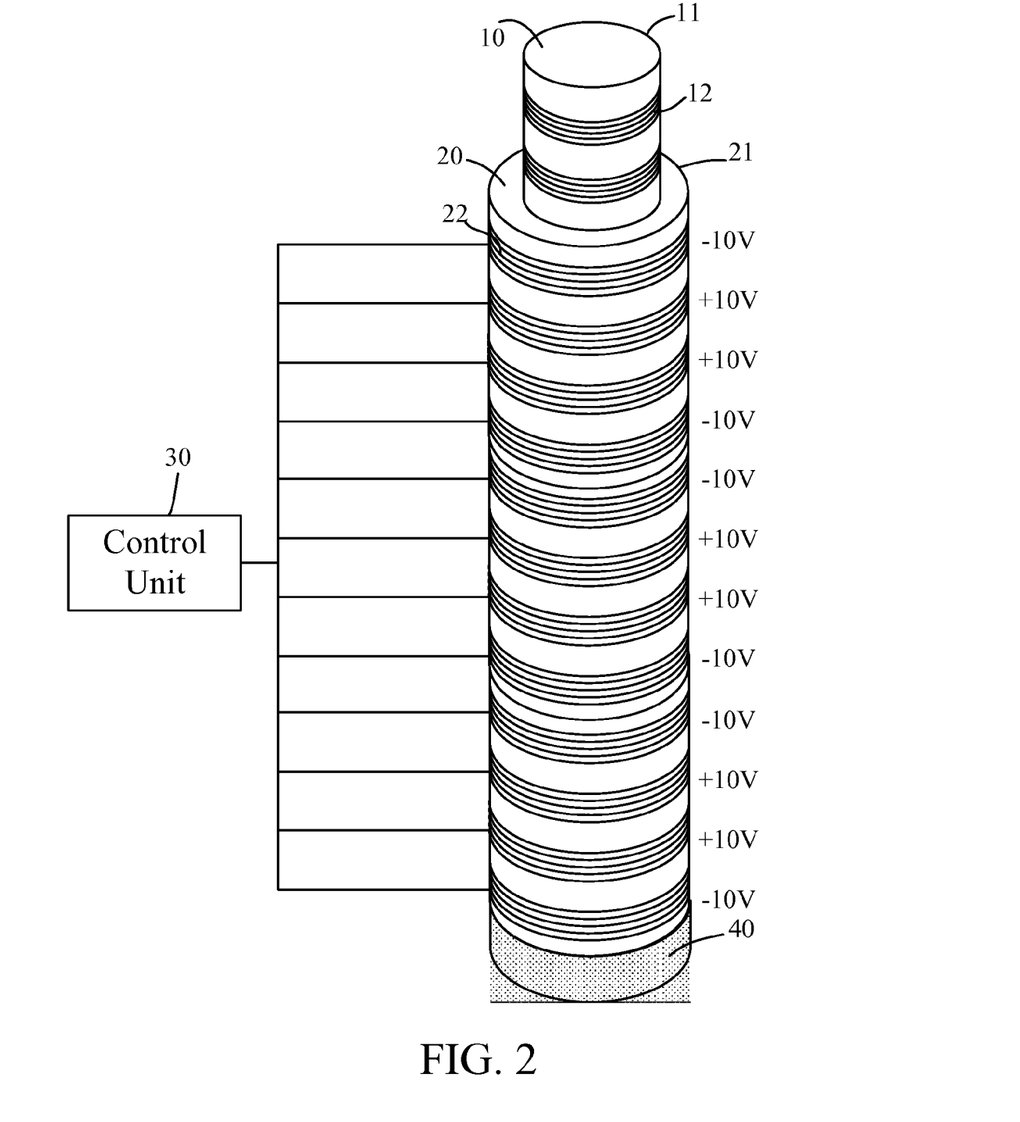
FIG. 2 is a schematic diagram showing that a control unit applies signals to outer-tube coils in the present invention.

As shown in FIG. 2, each outer tube 21 has four outer-tube coils 22 surrounding thereon, which are respectively called a first outer-tube coil, a second outer-tube coil, a third outer-tube coil, and a fourth outer-tube coil from top to bottom. The inner tube 11 has two inner-tube coils 12 surrounding thereon, which are respectively called a first inner-tube coil and a second inner-tube coil from top to bottom.

For an individual outer tube 21, the position coded signals applied to the outer tube 21 by the control unit 30 are sinusoidal waves respectively with −10V, +10V, +10V, and −10V, where positive and negative signs represent different polarities and 10V represents the largest amplitude. That is, when the control unit 30 applies a −10V signal to the first outer-tube coil, the control unit 30 applies a +10V signal to the second outer-tube coil, applies the +10V signal to the third outer-tube coil, and applies the −10V signal to the fourth outer-tube coil.

Figure 3A:
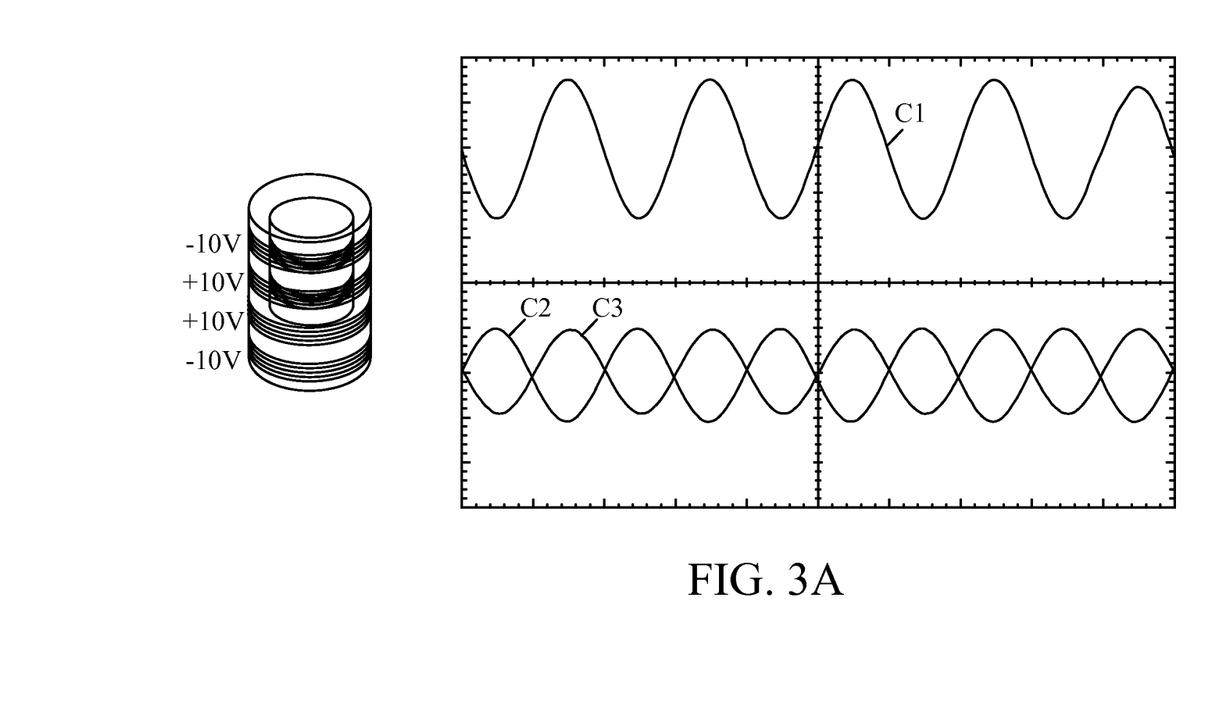
FIG. 3A is a schematic diagram showing signals generated when a first inner-tube coil and a second inner-tube coil respectively overlap or come close to a first outer-tube coil and a second outer-tube coil.
Figure 3B:
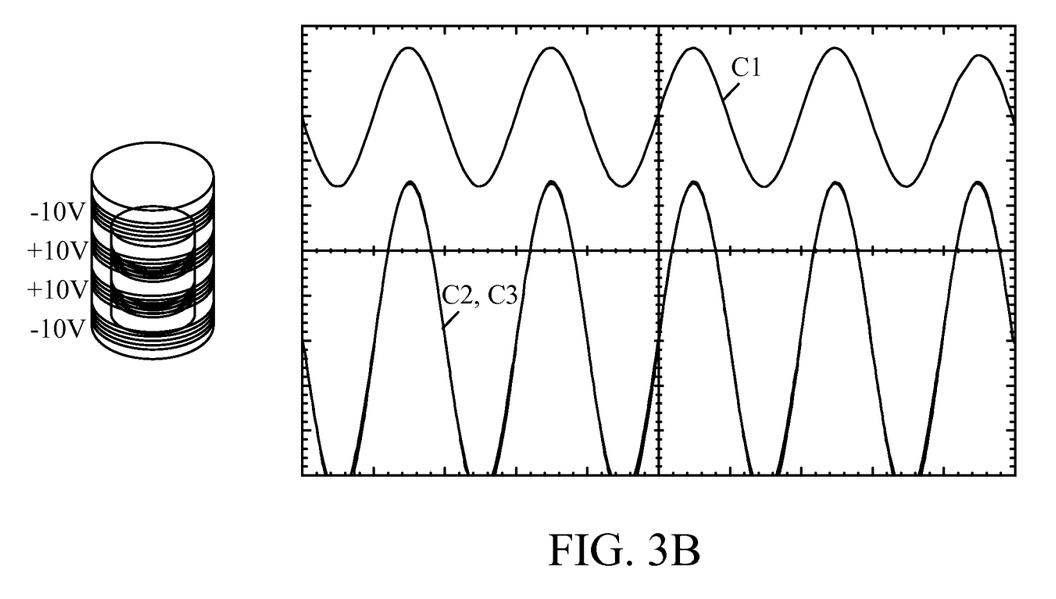
FIG. 3B is a schematic diagram showing signals generated when a first inner-tube coil and a second inner-tube coil respectively overlap or come close to a second outer-tube coil and a third outer-tube coil.
Figure 3C:
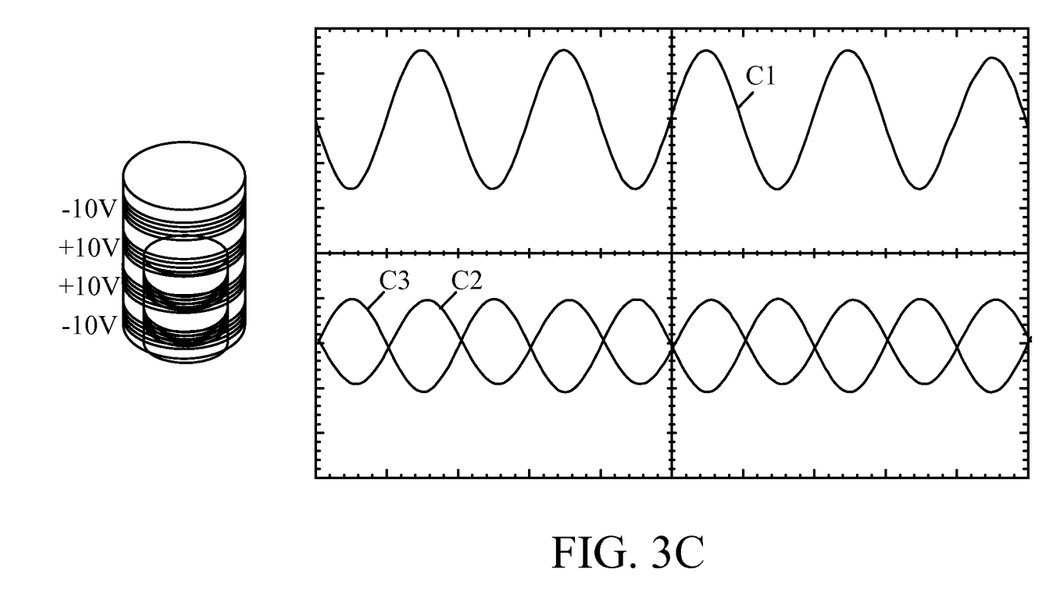
FIG. 3C is a schematic diagram showing signals generated when a first inner-tube coil and a second inner-tube coil respectively overlap or come close to a third outer-tube coil and a fourth outer-tube coil.

When the first inner-tube coil and the second inner-tube coil respectively overlap or come close to the first outer-tube coil and the second outer-tube coil, the induced signals generated respectively by the first inner-tube coil and the second inner-tube coil are respectively represented by Curve C2 and Curve C3 as shown in FIG. 3A. Similarly, when the first inner-tube coil and the second inner-tube coil respectively overlap or come close to the second outer-tube coil and the third outer-tube coil, the induced signals generated respectively by the first inner-tube coil and the second inner-tube coil are respectively represented by Curve C2 and Curve C3 as shown in FIG. 3B. When the first inner-tube coil and the second inner-tube coil respectively overlap or come close to the third outer-tube coil and the fourth outer-tube coil, the induced signals generated respectively by the first inner-tube coil and the second inner-tube coil are respectively represented by Curve C2 and Curve C3 as shown in FIG. 3C.

When the first inner-tube coil and the second inner-tube coil are at the positions as shown in FIG. 3A and a signal C1 applied to an outer-tube coil has positive polarity, the induced signals generated by the first inner-tube coil and the second inner-tube coil respectively has negative polarity and positive polarity. When the first inner-tube coil and the second inner-tube coil are at the positions as shown in FIG. 3C and the signal C1 applied to the outer-tube coil has positive polarity, the induced signals generated by the first inner-tube coil and the second inner-tube coil respectively has positive polarity and negative polarity. As can be seen, when the first inner-tube coil and the second inner-tube coil are at positions as respectively shown in FIG. 3A and FIG. 3C, the combinations of induced signals generated by the inner-tube coils are different from each other. Also, when the first inner-tube coil and the second inner-tube coil are at the positions as shown in FIG. 3B, the induced signals generated by the inner-tube coils are apparently different from Curve C2 and Curve C3 shown in FIG. 3A and FIG. 3C. As can be known from FIG. 3A to FIG. 3C, the inner-tube coils can generate different induced signals or different induced signal combinations at different positions or heights with respect to one individual outer tube 21.

In the present invention, the inner tube 11 can have at least two independent inner-tube coils (e.g., the first inner-tube coil and the second inner-tube coil) disposed thereon. In contrast to having one inner-tube coil disposed, the induced signals generated by two inner-tube coils arranged on the inner tube 11 provide more variety, and the accuracy of liquid level measurement can therefore be improved by using the combinations of induced signals generated by the two inner-tube coils to determine the liquid level.

In addition, in one embodiment, the liquid level measuring device may comprise a filter 40 (as shown in FIG. 2), which is arranged on the bottom surface of the lowest outer tube 21. The liquid may enter an area encompassed by the outer tubes 21 via the filter 40. The filter 40 is used to filter the solid matter existing in the liquid so as to prevent the solid matter from entering the outer tubes 21. In such a manner, the liquid level measuring device is suitable for being deployed in a river or in an area which is easily flooded.

Figure 4:
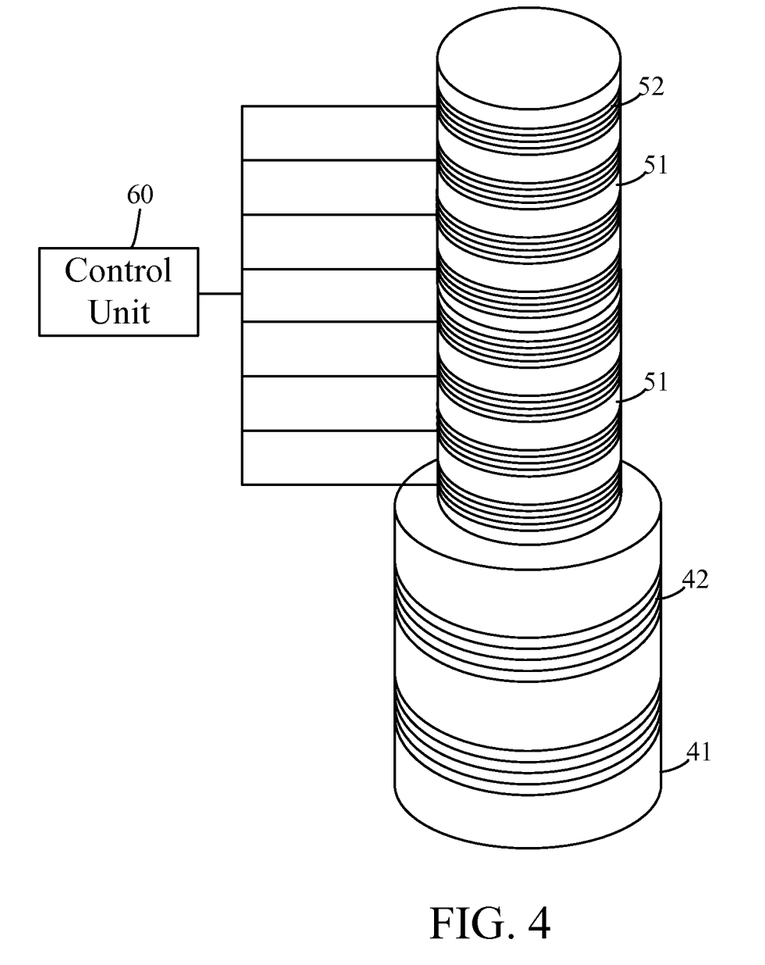
FIG. 4 is a schematic diagram showing a liquid level measuring device in accordance with a second embodiment of the present invention.

FIG. 4 is a schematic diagram showing a liquid level measuring device in accordance with a second embodiment of the present invention. The differences between the liquid level measuring devices of the first embodiment and the second embodiment of the present invention are that in the second embodiment, a plurality of inner tubes 51 are used, each inner tube 51 has a plurality of inner-tube coils 52 arranged thereon, the inner tubes 51 are stacked along a vertical direction, and an outer tube 41 embraces the inner tubes 51 and is risen and fallen as a liquid level varies, and the outer tube 41 has at least on outer-tube coil 42 surrounding thereon. In the second embodiment of the present invention, the control unit 60 transmits the position coded signals to the inner-tube coils 52 and the at least one outer-tube coil 52 generates the induced signal through electromagnetic induction. The operational principle of the second embodiment of the present invention is the same as that of the first embodiment as well as applications and technical variations. Accordingly, they are not detailed herein.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A liquid level measuring device, comprising:
   an inner-tube unit having an inner tube and at least one inner-tube coil surrounding the inner tube;
   an outer-tube unit having a plurality of outer tubes, each outer tube having a plurality of outer-tube coils disposed thereon, the outer tubes being stacked along a vertical direction, the inner tube being arranged inside the outer tubes and being risen and fallen as a liquid level of a liquid in the outer tubes varies; and
   a control unit electrically connecting to the respective outer-tube coils, the control unit transmitting a set of position coded signals to the outer-tube coils disposed on an individual outer tube and transmitting the same set of position coded signals to the outer-tube coils of every one of the outer tubes sequentially, the at least one inner-tube coil generating an induced signal through electromagnetic induction with the outer-tube coils corresponding to a liquid level where the inner tube is at, the control unit determining the liquid level according to the induced signal generated by the at least one inner-tube coil and information about a height of one outer tube receiving the position coded signals at the time the at least one inner-tube coil generates the induced signal.

2. The liquid level measuring device according to claim 1, wherein the position coded signals make the at least one inner-tube coil generate different induced signals when the at least one inner-tube coil is at different heights of one individual outer tube.

3. The liquid level measuring device according to claim 1, wherein the control unit receives the induced signal generated by the at least one inner-tube coil, and the induced signal is transmitted to the control unit by the outer-tube coils through electromagnetic induction.

4. The liquid level measuring device according to claim 3, wherein the induced signal generated by the at least one inner-tube coil is induced by the position coded signals applied to the outer-tube coils corresponding to the liquid level, and the induced signal generated by the at least one inner-tube coil is transmitted to the control unit by the outer-tube coils corresponding to the liquid level through electromagnetic induction.

5. The liquid level measuring device according to claim 1, wherein the induced signal generated by the at least one inner-tube coil is transmitted to the control unit through wireless transmission.

6. The liquid level measuring device according to claim 1, wherein the at least one inner-tube coil is electrically connected to the control unit via a cable, and the induced signal generated by the at least one inner-tube coil is directly transmitted to the control unit via the cable.

7. The liquid level measuring device according to claim 1, wherein the inner-tube unit has at least two independent inner-tube coils surrounding the inner tube.

8. The liquid level measuring device according to claim 1, wherein the set of position coded signals transmitted to one individual outer tube by the control unit comprises electronic signals having different physical properties.

9. The liquid level measuring device according to claim 8, wherein the set of position coded signals has different signal waveforms, frequencies, voltages, and/or polarities.

10. The liquid level measuring device according to claim 9, wherein the control unit receives the induced signal generated by the at least one outer-tube coil, and the induced signal is transmitted to the control unit by the inner-tube coils through electromagnetic induction.

11. The liquid level measuring device according to claim 10, wherein the induced signal generated by the at least one outer-tube coil is induced by the position coded signals applied to the inner-tube coils corresponding to the liquid level, and the induced signal generated by the at least one outer-tube coil is transmitted to the control unit by the inner-tube coils corresponding to the liquid level through electromagnetic induction.

12. The liquid level measuring device according to claim 1, wherein the outer-tube coils are further used to wirelessly charge electronic components in the inner-tube unit.

13. The liquid level measuring device according to claim 1, wherein the control unit firstly transmits the position coded signals to the outer-tube coils of one outer tube corresponding to a previously determined liquid level.

14. A liquid level measuring device, comprising:
   an outer-tube unit having an outer tube and at least one outer-tube coil surrounding the outer tube;
   an inner-tube unit having a plurality of inner tubes, each inner tube having a plurality of inner-tube coils disposed thereon, the inner tubes being stacked along a vertical direction, the outer tube embracing the inner tubes and being risen and fallen as a liquid level varies; and
   a control unit electrically connecting to the respective inner-tube coils, the control unit transmitting a set of position coded signals to the inner-tube coils disposed on an individual inner tube and transmitting the same set of position coded signals to the inner-tube coils of every one of the inner tubes sequentially, the at least one outer-tube coil generating an induced signal through electromagnetic induction with the inner-tube coils corresponding to a liquid level where the outer tube is at, the control unit determining the liquid level according to the induced signal generated by the at least one outer-tube coil and information about a height of one inner tube receiving the position coded signals at the time the at least one outer-tube coil generates the induced signal.

* * * * *